United States Patent
Lee et al.

(10) Patent No.: US 11,980,208 B2
(45) Date of Patent: May 14, 2024

(54) METHOD FOR MANUFACTURING RADISH MEAT WITH RICH FIBER AND TEXTURE BY PROCESSING RADISH

(71) Applicants: Gap Su Lee, Seoul (KR); Hye Jin Lee, Seoul (KR)

(72) Inventors: Gap Su Lee, Seoul (KR); Hye Jin Lee, Seoul (KR)

( * ) Notice: Subject to any disclaimer, the term of this patent is extended or adjusted under 35 U.S.C. 154(b) by 0 days.

(21) Appl. No.: 18/099,817

(22) Filed: Jan. 20, 2023

(65) Prior Publication Data

US 2023/0363429 A1 Nov. 16, 2023

(30) Foreign Application Priority Data

May 13, 2022 (KR) .................. 10-2022-0058839

(51) Int. Cl.
*A23L 19/00* (2016.01)
*A23L 19/20* (2016.01)

(52) U.S. Cl.
CPC ............... *A23L 19/03* (2016.08); *A23L 19/20* (2016.08)

(58) Field of Classification Search
CPC ...................................................... A23L 19/20
See application file for complete search history.

(56) References Cited

FOREIGN PATENT DOCUMENTS

| KR | 10-2012-0053468 A | 5/2012 | |
| KR | 10-2012-0134893 A | 12/2012 | |
| KR | 102200919 B1 * | 1/2021 | ............. A23L 19/10 |

OTHER PUBLICATIONS

Lasgarcia, Radish Pickles [Online], published Apr. 27, 2021, [retrieved on May 2, 2023]. Retrieved from the Internet: <URL: https://food52.com/recipes/6413-radish-pickles>; (Year: 2021).*
Tae-Yeun Kwon et al., "Prediction Model of Absorbed Quantity and Diffusivity of Salt in Radish during Salting", J. Korean Soc. Food Nutr., 1991, pp. 572-581, vol. 20.
Ji Hyun Park et al., The Effect of Freezing and Thawing Conditions on the Quality Characteristic of Blanched Radish (*Raphauns sativus* L.), Food Eng. Prog., 2018, pp. 67-74, vol. 22.
Kee-Young Han et al., "Effect of Calcium, Potassium and Magnesium Ion on Salting of Radish", Korean J. Food Sci. Technol., 1997, pp. 1071-1074, vol. 29.

* cited by examiner

*Primary Examiner* — Changqing Li
(74) *Attorney, Agent, or Firm* — Bridgeway IP Law Group, PLLC; Sang Ho Lee; Hyun Woo Shin

(57) ABSTRACT

Provided is a method for manufacturing radish meat with rich fiber and texture by processing radish. The method includes the steps of salting cut radish with salt, drying the salted radish, ripening the dried radish by soaking the radish in brine, freezing and then defrosting the ripened radish, and tearing fibrous texture of tissue of the defrosted radish is provided.

6 Claims, 3 Drawing Sheets

METHOD FOR MANUFACTURING RADISH MEAT WITH RICH FIBER AND TEXTURE BY PROCESSING RADISH

CROSS-REFERENCE TO RELATED APPLICATION(S)

The present application claims priority to Korean Patent Application No. 10-2022-0058839, filed on May 13, 2022, the entire contents of which is incorporated herein for all purposes by this reference.

BACKGROUND OF THE INVENTION

Field of the Invention

The present invention relates to a method for manufacturing radish meat with rich fiber and texture by processing radish.

Description of the Related Art

White radish is an herbaceous plant belonging to the Brassicaceae family and is one of the most widely used vegetables in Korea. It has various dietary effects such as cold prevention, digestive function improvement, hangover relief, anti-cancer, and weight loss.

These radishes have different tastes and uses depending on their varieties and parts, and are cooked in various ways in menus such as kimchi, seasoned with herbs, soup, and braised, showing a variety of tastes and textures.

However, conventionally, radishes are usually used as supplementary materials or cooked for side dishes, and as described above, there is a need to develop a method that can more actively utilize radishes having various effects, taste, and texture as food ingredients.

SUMMARY OF THE INVENTION

The present invention is to provide a method for manufacturing radish meat with rich fiber and texture by processing radish so that radish having various effects and taste and texture can be more actively used as a food material.

According to one aspect of the present invention, a method for manufacturing radish meat with rich fiber and texture by processing radish comprising the steps of salting cut radish with salt, drying the salted radish, ripening the dried radish by soaking the radish in brine, freezing and then defrosting the ripened radish, and tearing fibrous texture of tissue of the defrosted radish.

The method may further include the step of trimming the radish with skin thereof and then washing the radish, prior to the salting step.

The method may further include the step of cutting the radish in a longitudinal direction, prior to the salting step.

In the cutting step, the radish may be cut in the longitudinal direction to have a thickness of 4 to 5 cm.

The salting step may be performed by applying 200 to 300 parts by weight of salt to 3100 to 3200 parts by weight of the cut radish.

In the salting step, after turning over the radish to which the salt is applied, the radish may be salted for 7 to 9 hours, and in the drying step, the salted radish may be dried for 0.5 to 1.5 hours.

The ripening step may include the step of preparing the brine by boiling 49900 to 50100 parts by weight of water with 400 to 500 parts by weight of the salt and then cooling the boiled water to room temperature, In the ripening step, the dried radish may be soaked in the brine and ripened for 5 to 30 days in a refrigerated state of 2 to 4° C.

The freezing and then defrosting step may include the steps of freezing the ripened radish at −18 to −20° C. for 10 to 15 days, and defrosting the frozen radish at room temperature for a time greater than 0 and less than 1.5 hours.

In the tearing step, the fibrous texture of the tissue of the defrosted radish may be torn by at least one method of pounding, crushing, and pressing.

According to the present invention, it is possible to provide a method for manufacturing radish meat with rich fiber and texture by processing radish so that radish having various effects, taste and texture can be more actively used as a food ingredient.

DETAILED DESCRIPTION OF THE INVENTION

Figure 1:
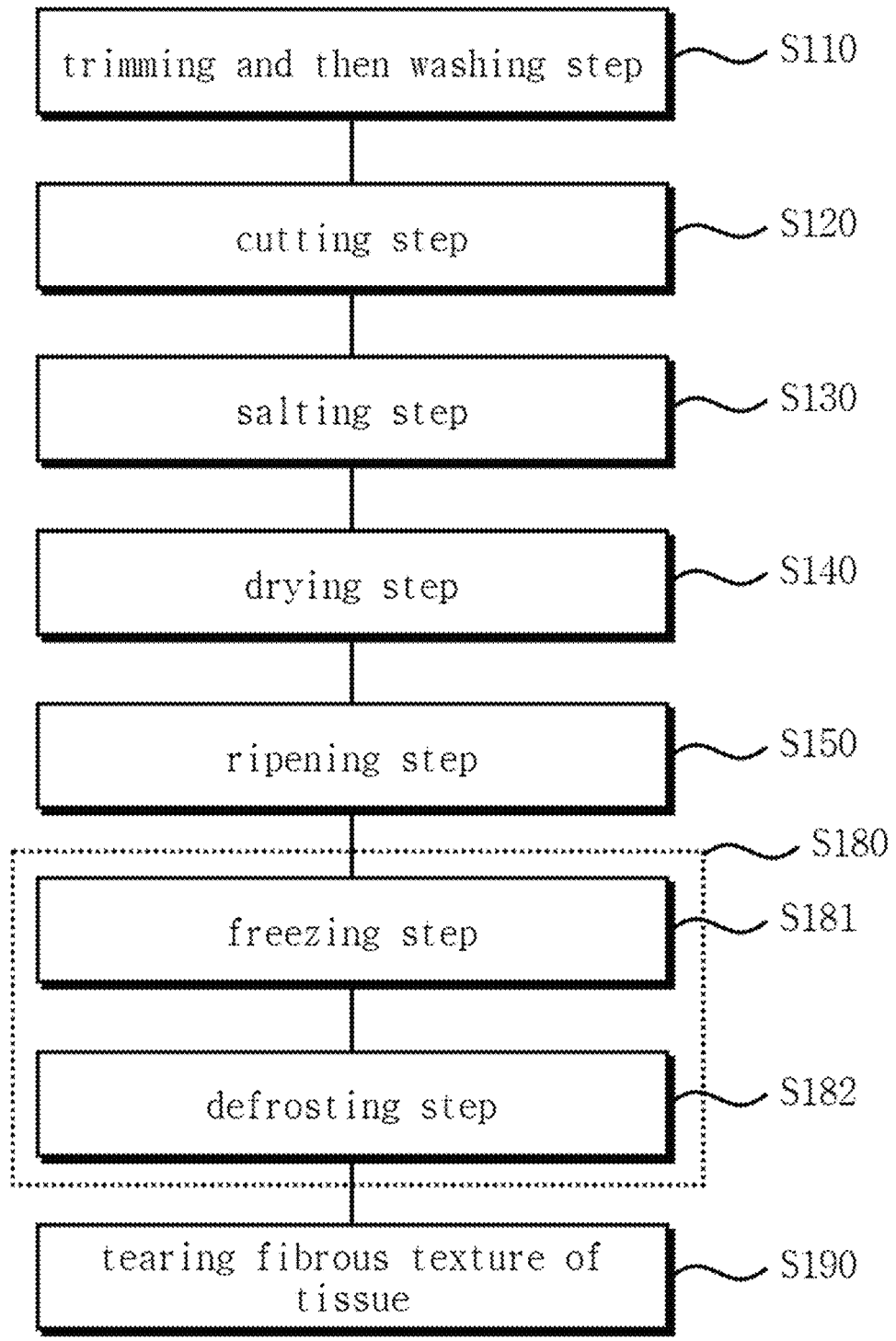
FIG. 1 is a flow chart showing a method for manufacturing radish meat with rich fiber and texture by processing radish according to an embodiment of the present invention.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention. If detailed description about well-known functions or configurations may make the subject matter of the disclosure unclear, the detailed description will be omitted.

Although the terms "first," "second," etc. may be used herein in reference to various elements, such elements should not be construed as limited by these terms. These terms are only used to distinguish one element from another.

The terminology used herein is for the purpose of describing particular embodiments only and is not intended to be limiting of embodiments of the present invention. As used herein, the singular forms are intended to include the plural forms as well, unless the context clearly indicates otherwise, It will be further understood that the terms "comprises," or "includes," when used herein, specify the presence of stated features, integers, steps, operations, elements, parts, and/or combinations thereof, but do not preclude the presence or addition of one or more other features, integers, steps, operations, elements, parts, and/or combinations thereof.

Hereinafter, a method for manufacturing radish meat with rich fiber and texture by processing radish according to the present invention will be described in detail with reference to the accompanying drawings. In the description with reference to the accompanying drawings, the same or corresponding components are assigned the same reference numerals, and duplicate descriptions thereof will be omitted.

FIG. 1 is a flow chart showing a method for manufacturing radish meat with rich fiber and texture by processing radish according to an embodiment of the present invention.

As shown in FIG. 1, an embodiment provides a method for manufacturing radish meat with rich fiber and texture by processing radish including the steps of salting cut radish with salt(S130), drying the salted radish(S140), ripening the dried radish by soaking the radish in brine(S150), freezing and then defrosting the ripened radish(S180), and tearing fibrous texture of tissue of the defrosted radish(S190).

According to this embodiment, it is possible to provide a method for manufacturing radish meat with rich fiber and texture by processing radish so that radish having various effects and taste and texture can be more actively used as a food material.

Hereinafter, each step of the method for manufacturing radish meat with rich fiber and texture by processing radish according to this embodiment will be described with reference to FIG. 1.

Since the food produced by processing radish according to this embodiment is new and has not been found before, terms are defined and used as follows to effectively define the produced food.

Similar to the way soy meat is coined, the 'radish meat' is a term created by combining the English word radish, which means radish, the raw material, and the English word meat, which means meat. This indicates a food with rich fiber and meat-like texture prepared by processing radish according to the present embodiment, and it may also be called 'meat by radish'.

In step 130, cut radish may be applied with slats and salted.

In this case, osmosis caused by salt may prevent or slow down the decay of radish to improve storage quality.

In addition, by appropriately draining the water from the radish, the radish does not soften and has a chewy texture, and at the same time, the flavor of the radish may be enhanced.

In step 140, the salted radish may be dried.

Accordingly, it is possible to prepare for the ripening step (S150) by further removing not only the moisture from the salted radish, but also the moisture inside the radish, and this will be further explained in the ripening step (S150).

More specifically, in the salting step (S130), the radish may be salted by applying 200 to 300 parts by weight of salt to 3100 to 3200 parts by weight of the cut radish.

As the weight part of salt relative to radish increases, the preservative effect may be increased, but as the dehydration rate increases, the appearance of the radish may become crumpled and the taste and texture may be reduced.

Therefore, by applying the salt of the above-mentioned weight part to the radish, it is possible to maintain a visually appropriate appearance while increasing the preservative effect of the radish and its taste and texture in a balanced manner.

More specifically, in the salting step (S130), after turning over the radish to which the salt is applied, the salting is performed for 7 to 9 hours, and in the drying step (S140), the salted radish may be dried for 0.5 to 1.5 hours.

In this case, by salting the radish during the salting time based on the weight part of the above-mentioned salt, the preservative effect of the radish as well as the desired taste and texture and appropriate appearance of the radish may be obtained. In this case, the salinity of the salted radish may be 4 to 5%.

In addition, by drying the radish for the above-mentioned drying time compared to the above-mentioned salting time after salting the radish, it is possible to properly remove the moisture inside the radish along with the moisture flowing out to the outside the radish by salting.

Meanwhile, in the drying step (S140), a hot air drying method may be used, and accordingly, the time required for drying may be effectively reduced in compared to the above-mentioned drying time.

Prior to the salting step (S130), the step of trimming the radish with skin thereof and then washing the radish (S110) may be further included.

Here, the radish is trimmed by trimming surface scratches with the skin without peeling the radish skin. By doing so, not only can the nutrients of the radish skin itself be preserved and consumed, but the texture may be further improved through the radish skin.

Prior to the salting step (S130), the step (S120) of cutting the radish in the longitudinal direction may be further included.

In this case, by cutting the radish in the longitudinal direction rather than the radial direction, the texture of the radish tissue may be saved, minimizing the fiber breakage of the radish and maintaining the crispy texture.

More specifically, in the cutting step (S120), the radish may be cut into 2 to 4 equal parts in the longitudinal direction.

In addition, in the cutting step (S120), the radish may be cut in the longitudinal direction to have the thickness of 4 to 5 cm.

That is, the radish may be cut into quarters or more, and in this case, the radish may be cut in the longitudinal direction to have the thickness of 4 to 5 cm so that there is no difficulty in processing due to the cut radish being too fine.

In step 150, the dried radish may be soaked in brine for ripening.

In this case, as water penetrates the dried radish according to the osmotic phenomenon, chemical changes occur inside the radish and the radish ripens, so that the taste and texture of the radish may be further improved.

More specifically, the ripening step (S150) may include preparing brine by boiling 49900 to 50100 parts by weight of water with 400 to 500 parts by weight of salt and then cooling the boiled water to room temperature.

In this case, the salinity of the brine is 0.8 to 1%, which is lower than the salinity of 4 to 5%, which is the salinity of the salted radish mentioned above, so that water may penetrate the dried radish due to osmosis.

In addition, by boiling the water with the salt and cooling it to room temperature, the solubility of salt may be increased and the water may be sterilized and purified.

Here, room temperature may be 15 to 25° C. as normal outdoor temperature.

In the ripening step (S150), the dried radish may be soaked in the brine and ripened for 5 to 30 days in a refrigerated state of 2 to 4° C.

In this case, fermentation of the radish may be effectively performed through low-temperature ripening, and in this case, since the radish is soaked in the brine, rapid cooling is prevented, thereby preventing defects in the radish.

In the ripening step (S150), a kimchi refrigerator may be used to ripen the radish in a refrigerated state.

In the case of a general refrigerator, since cooling is repeated according to the temperature change, the internal temperature change is large.

Therefore, by using a kimchi refrigerator in the ripening step (S150), the radish may be effectively ripened and fermented by stably maintaining a low temperature during the ripening period.

In step 180, the ripened radish may be frozen and then defrosted.

In this case, by freezing the ripened radish, the fibrous texture of the tissue of the water-permeated radish may be established.

In addition, by defrosting the frozen radish, moisture may be released from the radish to control the salinity of the radish and soften the fibrous texture of the tissue of the radish for subsequent processing, which will be further described in the step of tearing the fibrous texture (S190).

The freezing and then defrosting step (S180) may include the steps of freezing the ripened radish at −18 to −20° C. for 10 to 15 days (S181), and defrosting the frozen radish at room temperature for a time greater than 0 and less than 1.5 hours (S182).

By freezing the ripened radish during the freezing period at the above-mentioned freezing temperature and defrosting the frozen radish at room temperature during the above-mentioned defrosting time, it is possible to prevent defects in the radish due to rapid cooling and rapid defrosting.

Here, room temperature may be 15 to 25° C. as normal outdoor temperature.

Here, the salinity of the radish defrosted after frozen may be 20 to 22% due to moisture outflow due to defrosting.

In step 190, the fibrous texture of the tissue of the defrosted radish may be torn.

In this case, as described above, by tearing the fibrous texture of the tissue of the softened radish after freezing and defrosting, the radish meat may be easily ingested and have a chewy texture like meat.

In the step of tearing the fibrous texture (S190), the fibrous texture of the tissue of the defrosted radish may be torn by at least one method of pounding, crushing and pressing.

As a method of tearing the fibrous texture of the tissue of the defrosted radish, in the case of pounding the defrosted radish, the fibrous texture of the tissue of the radish may be naturally torn. In the case of crushing the defrosted radish, the fibrous texture of the tissue of the radish may be torn more finely, and in the case of compressing the defrosted radish, the fibrous texture of the tissue of the radish may be torn and compressed at the same time.

Here, the salinity of the radish whose fibrous texture is torn may be 0.5 to 0.7% due to water leakage according to at least one of pounding, crushing and compressing.

The tearing step (S190) may be performed for 4 to 5 minutes per cut piece of the defrosted radish when pounding, crushing or pounding and crushing the defrosted radish.

In this case, a mechanical device for pounding or crushing the defrosted radish may be used, thereby reducing unnecessary manpower and effectively shortening the process time.

In the step of tearing the fibrous texture (S190), in the case of compressing the defrosted radish, the radish may be compressed using a compression roller.

In this case, the compression roller may include a pair of rollers that pressurizes the defrosted radish while rotating, and a conveyor that transports the defrosted radish between the pair of rollers.

In the step of tearing the fibrous texture (S190), unnecessary manpower requirements may be reduced and process time may be effectively shortened by using the compression roller.

The salinity of radish for each step described above will be described. The pickling step (S130) is performed so that the salinity of the pickled radish is 4 to 5%, and the aging step (S150) is performed so that the salinity of the aged radish is 0.8 to 1%, the thawing step is performed so that the salinity of the thawed radish is 20 to 22%, and the step of tearing the texture (S190) is performed so that the salinity of the radish with the tissue torn is 0.5 to 0.7%.

Here, since the salinity of the radish changes greatly from the step of freezing and thawing (S180) to the step of tearing the texture (S190), the final salinity of the radish with the tissue torn may be varied or adjusted depending on the time taken for the step of freezing and thawing (S180).

Figure 2:
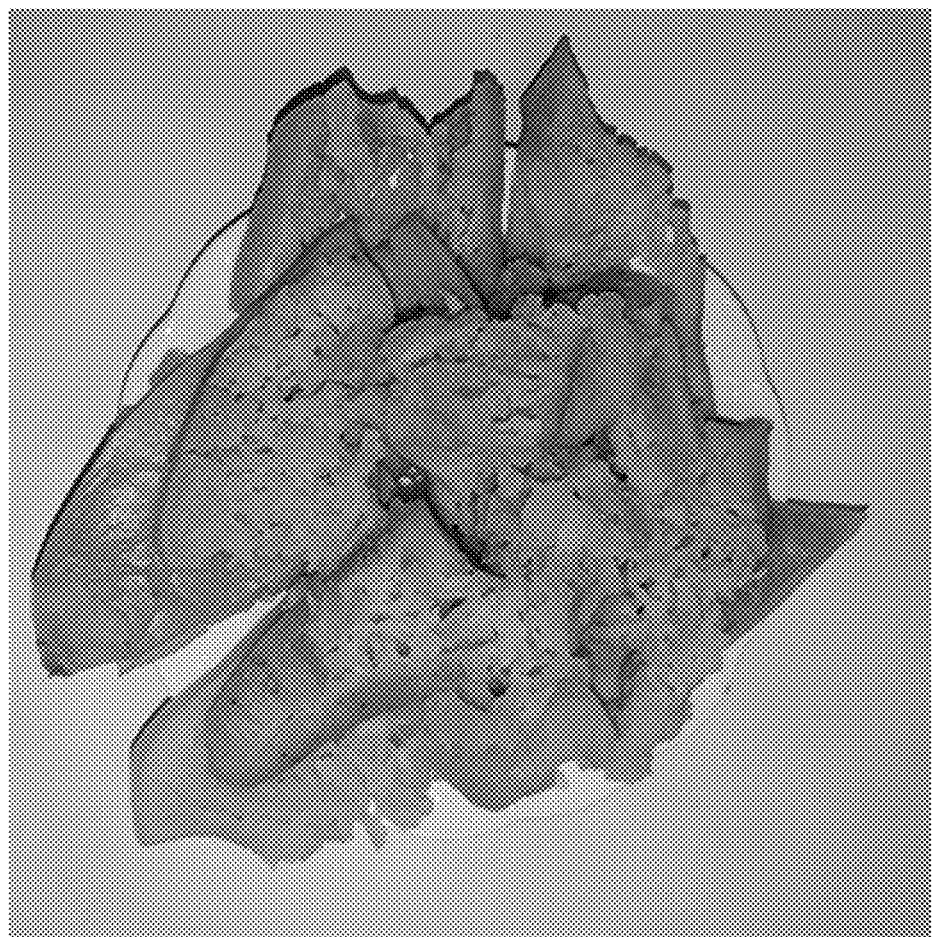
FIG. 2 is a photograph of radish meat manufactured according to an embodiment of the present invention.
Figure 3:
FIG. 3 is a photograph of radish meat manufactured according to an embodiment of the present invention.

FIGS. 2 and 3 are photographs taken of the radish meat manufactured according to this embodiment. FIG. 2 shows that the radish is torn after beaten in the process of tearing the texture of the radish, and FIG. 3 shows that the radish is only beaten in the process of tearing the texture of the radish.

Comparing FIGS. 2 and 3, it can be seen that the texture or fibrous texture in the case of tearing after pounding in the process of tearing the texture is more vivid than that in the case of only pounding.

A sensory test was conducted on the radish meat according to this example.

As shown in Table 1 below, Examples 1 and 2 are the radish meats prepared by the manufacturing method according to this example, and Comparative Examples 1 to 3 are prepared by different conditions from Examples 1 and 2, Conditions other than the conditions shown in Table 1 below were applied identically to those of this embodiment.

TABLE 1

<Comparison of manufacturing process conditions of Examples and Comparative Examples>

| Process Conditions | Example 1 | Example 2 | Comparative Example 1 | Comparative Example 2 | Comparative Example 3 |
|---|---|---|---|---|---|
| Salting salinity | 4.5% | 4.3% | 3.5% | 5.5% | 6.0% |
| Slating time | 8 hours | 7.5 hours | 10 hours | 6 hours | 6 hours |
| Drying time | 1 hours | 1.2 hours | 0.4 hours | 2 hours | 1.8 hours |
| Brine salinity | 0.9% | 1.0% | 0.7% | 0.7% | 1.2% |
| Ripening period | 18 days | 25 days | 3 days | 4 days | 2 days |
| Freezing period | 12 days | 12 days | 8 days | 16 days | 17 days |
| Thawing time | 0.75 hours | 0.4 hours | 1.6 hours | 1.7 hours | 0 hours |
| Tearing time | 4.5 minutes | 5 minutes | 6 minutes | 3.5 minutes | 6.5 minutes |

In this test, 20 people participated, and after visual inspection and tasting of Examples 1 and 2 and Comparative Examples 1 to 3, respectively, evaluation was made by a questionnaire method with 10 points as the highest point and 1 point as the lowest point. The results are summarized in Table 2 below.

TABLE 2

<Sensory test result>

| Category | Color | Aroma | Taste | Texture | Preference |
|---|---|---|---|---|---|
| Example 1 | 8.9 | 8.7 | 9.3 | 9.1 | 9.3 |
| Example 2 | 8.7 | 8.6 | 9.4 | 9.2 | 9.4 |
| Comparative Example 1 | 8.0 | 8.1 | 7.8 | 7.5 | 7.0 |
| Comparative Example 2 | 8.2 | 8.3 | 7.6 | 7.3 | 7.4 |
| Comparative Example 3 | 8.0 | 8.2 | 7.7 | 7.2 | 7.3 |

As confirmed in Table 2 above, Examples 1 and 2 prepared according to this example were highly evaluated in all items compared to Comparative Examples 1 to 3.

In particular, it was found to have excellent taste, texture, and preference, and based on this, it is determined that radish meat having excellent taste and texture can be manufactured using this embodiment.

The radish meat prepared according to this embodiment has a good texture and a light taste, and when ingested, the dietary effects of radish, such as cold prevention, digestive function improvement, hangover relief, anticancer, weight loss, etc. can be obtained.

In addition, radish meat has a chewy texture similar to meat, so when consumed with meat, the compatibility is very good, and the amount of meat intake can be reduced, so it can be useful for people who control their diet for weight loss.

As described above, radish meat may be consumed by roasting it with meat, or it may be cooked and consumed together with meat.

In addition, since radish meat is manufactured by processing radishes, it is rich in dietary fiber, so when consumed with meat, it promotes digestion and activates bowel movements to prevent constipation.

As described above, radish meat is prepared by ripening and fermenting radish and then tearing the texture of the tissue again, so even those who have a poor digestive system and need to be careful about eating vegetables high in fiber can enjoy it without any burden.

Depending on the meat-like texture of radish meat, radish meat may be cooked and consumed separately from meat.

In particular, when radish meat is surface seasoned and then grilled and consumed, it can feel the same taste and texture as seasoned roast, similar to grilled bonnet bellflower roots.

When radish meat manufactured through ripen fermentation is cooked with heat, even people with hypothyroidism who need to avoid eating radish can enjoy tasty radish meat due to the goitrogens contained in radish.

In addition, since radish meat is processed with the skin of the radish as described above, even the nutrients in the skin of the radish can be fully ingested through the radish meat.

On the other hand, since radish meat is manufactured through the ripen process as described above, various effects that can be obtained from fermented foods such as kimchi can be obtained through consumption of radish meat.

As described above, although one embodiment of the present invention have been described, it will be appreciated by those skilled in the art that various modifications and variations may be made to the present invention by adding, changing, or deleting elements within the scope not departing from the spirit of the present invention described in the claims, which is also included within the scope of the present invention.

What is claimed is:

1. A method for manufacturing radish meat with rich fiber and texture by processing radish comprising the steps of:
    applying salt to cut radish and salting the cut radish for 7 to 9 hours so that the cut radish has a salinity of 4 to 5%;
    drying the salted radish for 0.5 to 1.5 hours;
    soaking the dried radish in brine having a salinity of 0.8 to 1% and ripening the dried radish for 5 to 30 days in a refrigerated state of 2 to 4° C.;
    freezing and then thawing the ripened radish; and
    tearing fibrous texture of tissue off the thawed radish,
    wherein the step of ripening is performed so that the salinity of the radish is 0.8 to 1%,
    wherein the step of freezing and then thawing comprises the steps of:
    freezing the ripened radish at −18 to −20° C. for 10 to 15 days; and
    thawing the frozen radish at room temperature for a time greater than 0 and less than 1.5 hours,
    wherein the step of tearing the fibrous texture of the tissue is performed for 4 to 5 minutes while subjecting the thawed radish to at least one of pounding, crushing, and pressing to facilitate the tearing the fibrous texture of the tissue of the radish,
    wherein the salinity of the radish is 0.5 to 0.7% after the tearing the fibrous texture of the tissue while subjecting the thawed radish to at least one of the pounding, the crushing, and the pressing.

2. The method of claim 1, further comprising a step of trimming the radish with skin thereon and then washing the radish, prior to the salting step.

3. The method of claim 1, further comprising a step of cutting the radish in a longitudinal direction, prior to the salting step.

4. The method of claim 3, wherein the longitudinally cut radish has a thickness of 4 to 5 cm.

5. The method of claim 1, wherein the salting step is performed by applying 200 to 300 parts by weight of salt to 3100 to 3200 parts by weight of the cut radish.

6. The method of claim 1, wherein the ripening step comprises a step of preparing the brine by boiling 49900 to 50100 parts by weight of water with 400 to 500 parts by weight of the salt and then cooling the boiled water to room temperature.

\* \* \* \* \*